United States Patent
Lee et al.

(10) Patent No.: US 7,097,426 B2
(45) Date of Patent: Aug. 29, 2006

(54) CASCADE IMPINGEMENT COOLED AIRFOIL

(75) Inventors: Ching-Pang Lee, Cincinnati, OH (US); Aspi Rustom Wadia, Loveland, OH (US); David Glenn Cherry, Loveland, OH (US)

(73) Assignee: General Electric Company, Schenectady, NY (US)

( * ) Notice: Subject to any disclaimer, the term of this patent is extended or adjusted under 35 U.S.C. 154(b) by 221 days.

(21) Appl. No.: 10/820,325

(22) Filed: Apr. 8, 2004

(65) Prior Publication Data

US 2005/0226726 A1    Oct. 13, 2005

(51) Int. Cl.
*F01D 5/18*    (2006.01)
(52) U.S. Cl. .................. 416/97 R; 416/96 R
(58) Field of Classification Search ............ 416/97 R, 416/96 R, 96 A; 415/115, 116
See application file for complete search history.

(56) References Cited

U.S. PATENT DOCUMENTS

| | | | |
|---|---|---|---|
| 4,413,949 A | 11/1983 | Scott | |
| 4,770,608 A | 9/1988 | Anderson et al. | |
| 5,165,852 A | 11/1992 | Lee et al. | |
| 5,246,340 A * | 9/1993 | Winstanley et al. | ....... 416/97 R |
| 5,356,265 A | 10/1994 | Kercher | |
| 5,387,085 A | 2/1995 | Thomas et al. | |
| 5,498,133 A | 3/1996 | Lee | |
| 5,626,462 A | 5/1997 | Jackson et al. | |
| 5,660,524 A | 8/1997 | Lee et al. | |
| 5,690,472 A | 11/1997 | Lee | |
| 5,690,473 A | 11/1997 | Kercher | |
| 5,720,431 A | 2/1998 | Sellers et al. | |
| 5,813,835 A | 9/1998 | Corsemeier et al. | |
| 6,036,441 A | 3/2000 | Manning et al. | |
| 6,126,396 A * | 10/2000 | Doughty et al. | .......... 416/97 R |
| 6,402,471 B1 * | 6/2002 | Demers et al. | .......... 416/97 R |
| 6,554,563 B1 | 4/2003 | Noe et al. | |

* cited by examiner

*Primary Examiner*—Edward K. Look
*Assistant Examiner*—Nathan Wiehe
(74) *Attorney, Agent, or Firm*—William S. Andes; Francis L. Conte

(57) ABSTRACT

A turbine blade includes an airfoil having opposite pressure and suction sidewalls joined together at opposite leading and trailing edges and extending longitudinally from root to tip. A plurality of independent cooling circuits are disposed inside the airfoil correspondingly along the pressure and suction sidewalls thereof. Each circuit includes an inlet channel extending through the dovetail. One of the circuits includes multiple longitudinal channels separated by corresponding perforate partitions each including a row of impingement holes for cascade impingement cooling the inner surface of the airfoil.

28 Claims, 4 Drawing Sheets

CASCADE IMPINGEMENT COOLED AIRFOIL

The U.S. Government may have certain rights in this invention pursuant to contract number F33615-02-C-2212 awarded by the U.S. Department of the Air Force.

BACKGROUND OF THE INVENTION

The present invention relates generally to gas turbine engines, and, more specifically, to turbine airfoil cooling.

In a gas turbine engine air is pressurized in a compressor and mixed with fuel in a combustor for generating hot combustion gases. Energy is extracted from the combustion gases in a high pressure turbine which powers the compressor, and further in a low pressure turbine which produces output power such as driving a fan in a typical turbofan aircraft engine application.

The high pressure turbine first receives the hottest combustion gases and is typically cooled for enhancing its durability and life. A high pressure turbine nozzle initially directs the hot combustion gases into the first row of high pressure turbine rotor blades extending radially outwardly from a supporting rotor disk.

The vanes and blades have suitable airfoil configurations for efficiently extracting energy from the combustion gases. The vane airfoils are hollow and suitably mounted at their radially outer and inner ends in corresponding stationary stator bands.

Each turbine blade includes a hollow airfoil and integral supporting dovetail which is mounted in a corresponding dovetail slot in the perimeter of the rotor disk for retention thereof. The row of rotor blades rotates during operation on the supporting disk for extracting energy from the combustion gases and driving the engine compressor.

Both the turbine nozzle vanes and turbine rotor blades require suitable cooling thereof during operation by providing thereto cooling air bled from the compressor. It is desirable to minimize the amount of cooling air bled from the compressor for maximizing efficiency and performance of the engine.

Accordingly, cooling configurations for the stator vanes and rotor blades have become quite sophisticated and esoteric over the many decades of continuing development thereof. Minor changes in cooling configurations of these components have significant affect on the cooling performance thereof, and in turn significantly affect efficiency and performance of the entire engine.

The airfoils of the vanes and blades may use similar cooling features, but suitably modified for the different configurations of the vanes and blades, and their different operation since the vanes are stationary, whereas the blades rotate during operation and are subject to considerable centrifugal forces.

The hollow airfoils of the vanes and blades typically have multiple radially or longitudinally extending cooling channels therein in one or more independent cooling circuits. The channels typically include small ribs or turbulators along the inner surface of the airfoils which trip the cooling air for enhancing heat transfer during the cooling process.

Typical cooling circuits include serpentine circuits wherein the cooling air is channeled successively through the serpentine legs for cooling the different portions of the airfoil prior to discharge therefrom.

The vanes and blades typically include various rows of film cooling holes through the pressure and suction sidewalls thereof which discharge the spent cooling air in corresponding films that provide additional thermal insulation or protection from the hot combustion gases which flow thereover during operation.

Yet another conventional cooling configuration includes separate impingement baffles or inserts disposed inside the nozzle vanes for impingement cooling the inner surface thereof. The baffles include a multitude of small impingement holes which typically direct the cooling air perpendicular to the inner surface of the vane for impingement cooling thereof. The spent impingement cooling air is then discharged from the vane through the various film cooling holes.

Impingement cooling of turbine rotor blades presents the additional problem of centrifugal force as the blades rotate during operation. Accordingly, turbine rotor blades typically do not use separate impingement baffles therein since they are impractical, and presently cannot meet the substantially long life requirements of modern gas turbine engines.

Instead, impingement cooling a turbine rotor blade is typically limited to small regions of the blade such as the leading edge or pressure or suction sidewalls thereof. Impingement cooling is introduced by incorporating a dedicated integral bridge or partition in the airfoil having one or more rows of impingement holes. Turbine rotor blades are typically manufactured by casting, which simultaneously forms the internal cooling circuits and the local impingement cooling channels.

The ability to introduce significant impingement cooling in a turbine rotor blade is a fundamental problem not shared by the nozzle stator vanes. And, impingement cooling results in a significant pressure drop of the cooling air, and therefore requires a corresponding driving pressure between the inside and outside of the airfoils during operation.

Since the pressure distribution of the combustion gases as they flow over the pressure and suction sides of the airfoils varies accordingly, the introduction of impingement cooling in turbine rotor blades must address the different discharge pressure outside the blades relative to a common inlet pressure of the cooling air first received through the blade dovetails in a typical manner.

Accordingly, it is desired to provide a turbine rotor blade having improved impingement cooling therein.

BRIEF DESCRIPTION OF THE INVENTION

A turbine blade includes an airfoil having opposite pressure and suction sidewalls joined together at opposite leading and trailing edges and extending longitudinally from root to tip. A plurality of independent cooling circuits are disposed inside the airfoil correspondingly along the pressure and suction sidewalls thereof. Each circuit includes an inlet channel extending through the dovetail. One of the circuits includes multiple longitudinal channels separated by corresponding perforate partitions each including a row of impingement holes for cascade impingement cooling the inner surface of the airfoil.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
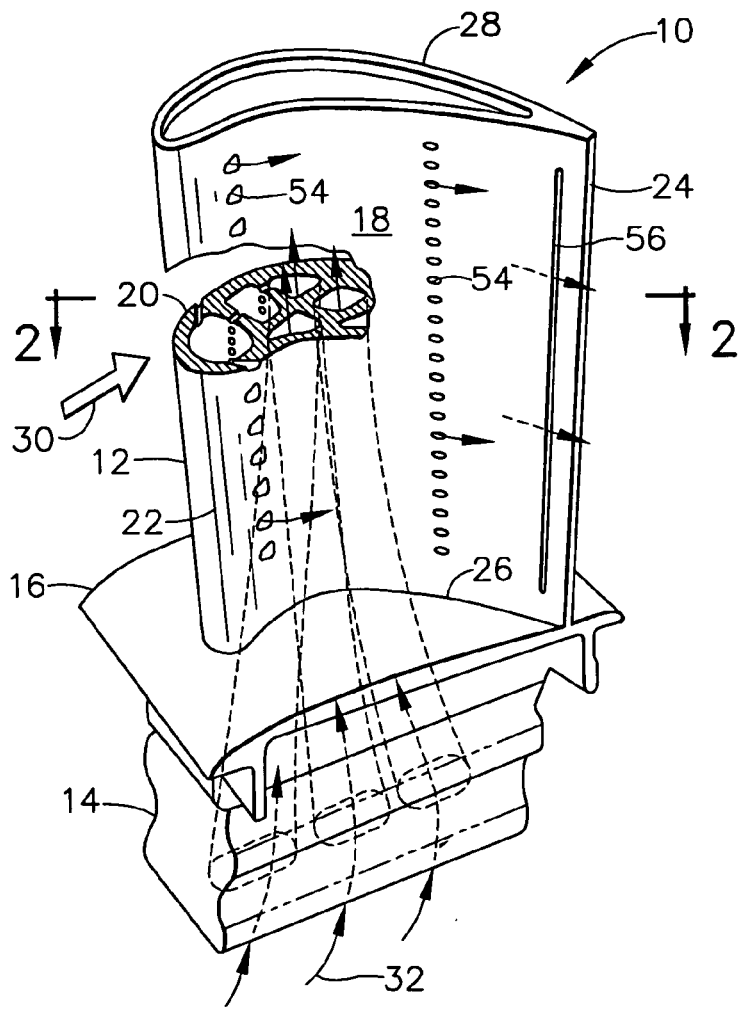
FIG. 1 is a partly sectional, isometric view of an exemplary gas turbine engine turbine rotor blade having cascade impingement cooling circuits therein.

Illustrated in FIG. 1 is a gas turbine rotor blade 10 for use in a conventional gas turbine engine, such as a turbofan aircraft engine (not shown). The blade itself is typically manufactured using conventional casting techniques, and includes an airfoil 12 integrally joined to a mounting dovetail 14 at a platform 16.

The airfoil includes a generally concave pressure sidewall 18, and a circumferentially opposite, generally convex suction sidewall 20 integrally joined together at chordally opposite leading and trailing edges 22,24. The airfoil also extends longitudinally or radially from a radially inner root 26 at the platform 16 to a radially opposite tip 28.

During operation, the blade is mounted in a supporting rotor disk (not shown) by trapping the dovetail 14 in a complementary dovetail slot. In this way, centrifugal forces generated in the blade during rotary operation are carried through the lobes or tangs of the dovetail into the supporting rotor disk.

Hot combustion gases 30 are generated in a combustor (not shown) and flow over the external surfaces of the airfoil which extracts energy therefrom for rotating the rotor disk. As indicated above, the turbine rotor blade requires cooling for ensuring its durability and long useful life, and cooling air 32 is suitably bled from the high pressure compressor (not shown) of the engine during operation.

Figure 2:
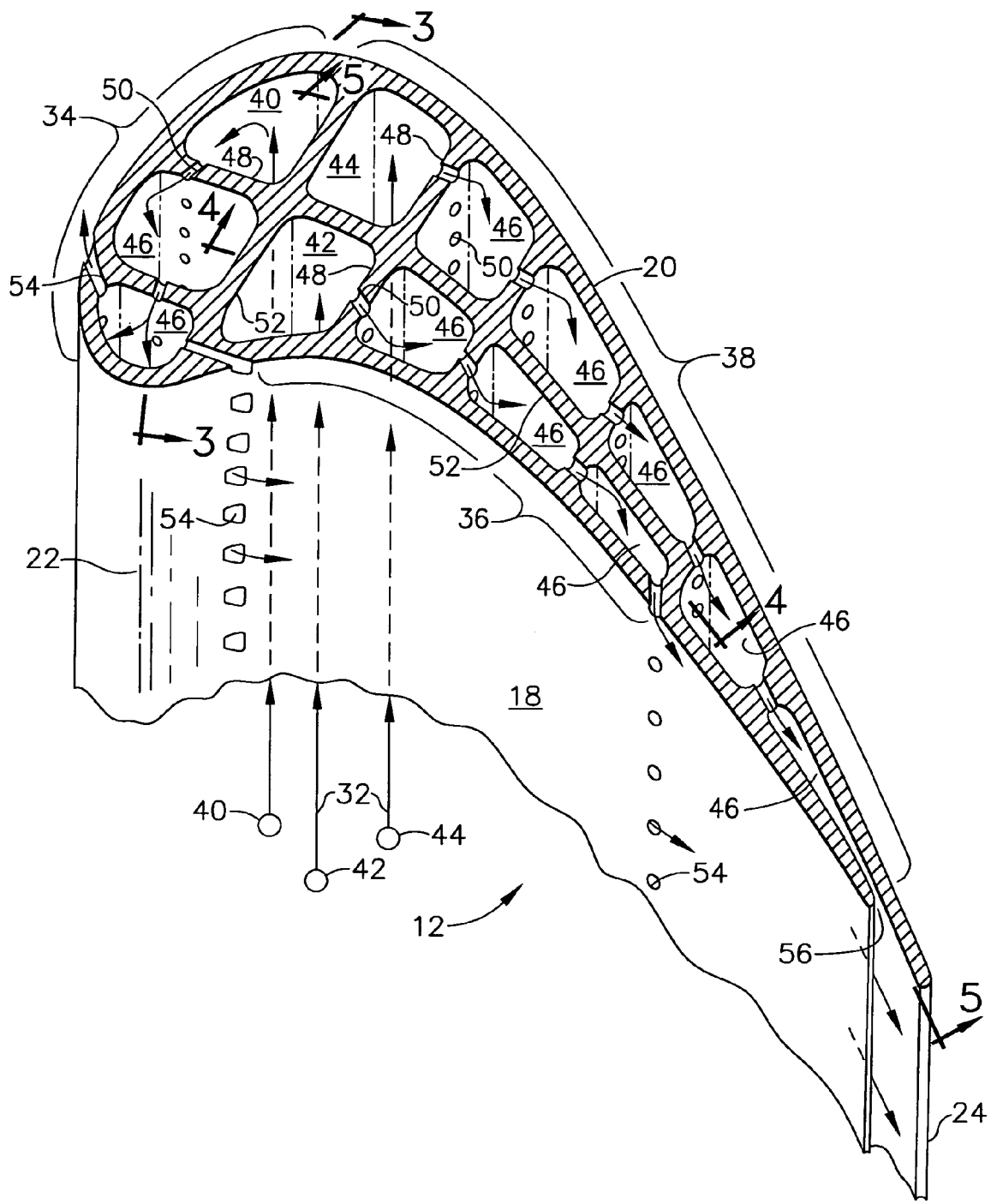
FIG. 2 is a partly sectional, isometric view of a portion of the airfoil illustrated in FIG. 1 and taken along line 2—2.

The airfoil 12 is illustrated in more detail in FIG. 2 and includes a plurality of independent cooling circuits 34,36,38 disposed inside the airfoil and extending longitudinally from root to tip thereof. The exemplary three cooling circuits extend correspondingly along the pressure and suction sidewalls 18,20, with each circuit including its own independent inlet channel 40,42,44. The three inlet channels extend longitudinally outwardly in the airfoil from root to just below the tip, and inwardly through the platform and dovetail to the base of the dovetail as illustrated in FIG. 1 for receiving the pressurized cooling air 32 suitably channeled thereto from the engine compressor.

Figure 3:
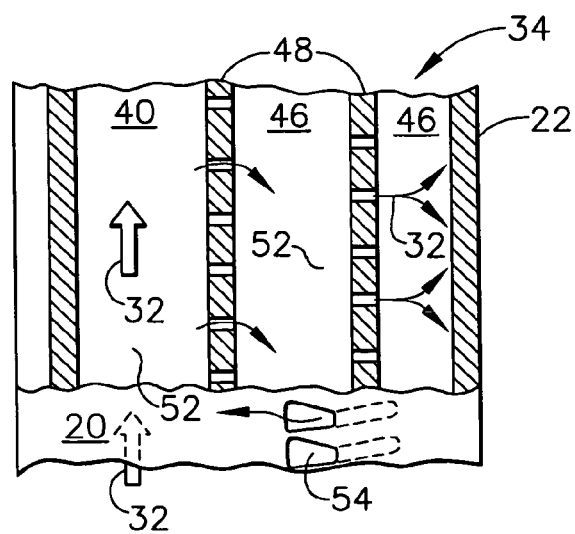
FIG. 3 is an elevational sectional view through a leading edge region of the airfoil illustrated in FIG. 2 and taken along line 3—3.

A first one of the cooling circuits 34 is illustrated in FIGS. 2 and 3 and includes multiple cascade flow channels 46 extending longitudinally from root to tip of the airfoil and separated axially or chordally by corresponding perforate partitions or bridges 48. Each bridge includes a longitudinal row of impingement holes 50 extending obliquely therethrough for cascade impingement cooling in series the inner surface of the airfoil using the same air 32 received through the first inlet channel 40.

Accordingly, the first cascade cooling circuit 34 preferably commences aft of the leading edge near the midchord of the airfoil, and extends forwardly along the suction sidewall 20 and terminates immediately behind or at the leading edge 22. The first circuit 34 includes the first inlet channel 40 and preferably two cascade channels 46, with two corresponding perforate partitions 48. The cooling air 32 is thusly channeled in series through the three channels for providing two successive stages of impingement cooling in corresponding cascades extending over the radial span of the airfoil, finally providing impingement cooling directly behind the airfoil leading edge 22.

Figure 4:
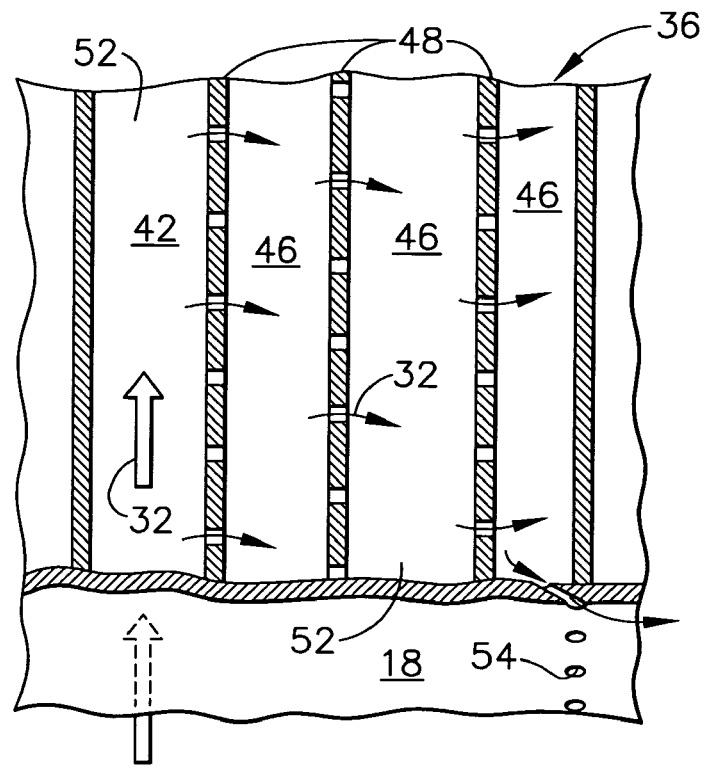
FIG. 4 is an elevational sectional view of a portion of the pressure side of the airfoil illustrated in FIG. 2 and taken along line 4—4.

As illustrated in FIGS. 2 and 4, the second cooling circuit 36 is preferably also a cascade cooling circuit including multiple cascade channels 46 extending longitudinally from root to tip of the airfoil and separated chordally by the corresponding perforate partitions 48. Each of those partitions similarly includes a longitudinal row of impingement holes 50 for cascade impingement cooling the airfoil inner surface chordally therealong.

As best shown in FIG. 2, the first cascade circuit 34 is disposed along the suction sidewall 20 and terminates at the leading edge 22. The second cascade circuit 36 extends along the pressure sidewall 18 behind the first circuit and terminates suitably before the trailing edge 24.

Figure 5:
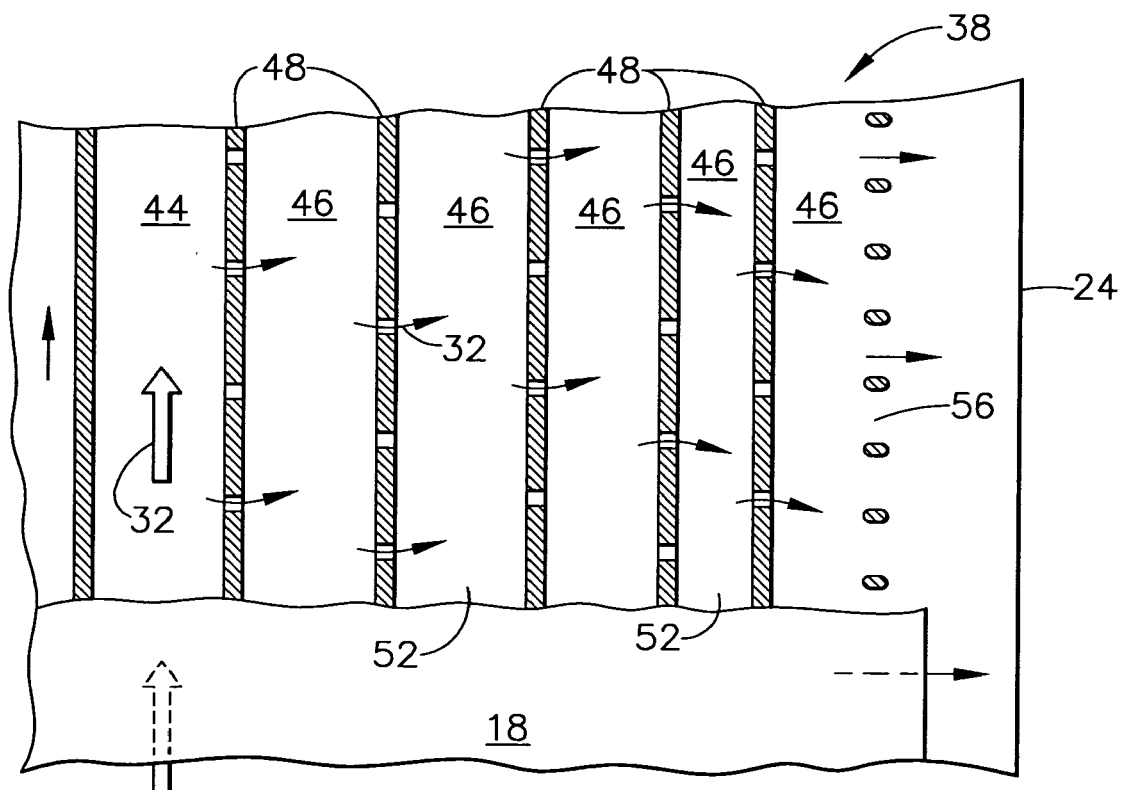
FIG. 5 is an elevational sectional view of a portion of the suction side of the airfoil illustrated in FIG. 2 and taken along line 5—5.

In the exemplary embodiment illustrated in FIGS. 2 and 5, the third cooling circuit 38 is also a similarly configured cascade cooling circuit and includes multiple cascade flow channels 46 extending longitudinally between the root and tip of the airfoil and separated chordally by the corresponding perforate partitions 48. Each of those partitions includes a longitudinal row of impingement holes 50 for cascade impingement cooling the airfoil inner surface chordally therealong.

The third cascade circuit 38 illustrated in FIG. 2 commences behind the first circuit 34 near the midchord of the airfoil and extends along the suction sidewall 20, and terminates at the trailing edge 24. The second and third cascade circuits 36 and 38 thusly are disposed behind the first cascade circuit 34, and extend in parallel along the two opposite sides 18,20 of the airfoil both terminating at or near the trailing edge 24.

The second cascade circuit 36 illustrated in FIG. 2 includes its own second inlet channel 42 providing the cooling air 32 in series to three of the cascade channels 46 through the corresponding impingement holes 50 in the three perforate partitions 48.

Correspondingly, the third cascade circuit 38 includes its own third inlet channel 44 which provides the cooling air 32 in series to the five cascade channels 46 through the corresponding rows of impingement holes 50 in the five perforate partitions 48 of the circuit.

The single airfoil illustrated in FIG. 2 therefore includes three independent and distinct cooling circuits 34,36,38, all three of which are preferably configured for cascade impingement cooling of their respective portions of the pressure and suction sidewalls.

Accordingly, the three cooling circuits 34–38 are separated from each other along the corresponding sidewalls 18,20 by corresponding imperforate bridges or partitions 52. The imperforate partitions 52 extend along the span of the airfoil between the root and tip thereof to maintain separate the three cooling circuits. The first circuit 34 illustrated in FIG. 2 is separated from the second and third circuits 36,38 by aligned and coplanar partitions 52 which extend from the pressure sidewall 18 just behind the leading edge 22 to the suction sidewall 20 near the maximum width of the airfoil at the hump of the suction sidewall.

Correspondingly, the second and third cooling circuits 36,38 extend in parallel along the opposite pressure and suction sidewalls of the airfoil from the first circuit axially or chordally aft to the trailing edge, with the multiple cascade channels thereof converging in lateral width as the airfoil converges or tapers to its relatively thin trailing edge. Four imperforate partitions 52 extend along the camber or mean line of the airfoil to symmetrically separate the second and third circuits from each other.

Since the three inlet channels 40–44 illustrated in FIG. 2 distribute the cooling air to the corresponding cascade channels 46 disposed in flow communication therewith, those three inlet channels themselves do not provide impingement cooling of the airfoil in this region.

However, the three inlet channels are preferably grouped together and adjoin each other in the maximum width region of the airfoil and all receive in parallel the cooling air 32 from the inlet apertures in the base of the dovetail. The three inlet channels themselves may therefore be adequately cooled by the initially received cooling air prior to distribution in the three cascade cooling circuits.

The three inlet channels 40–44 are preferably separated from the leading edge 22 by one of the cascade channels 46 disposed therebetween. For example, the first inlet 40 is separated from the leading edge by the two cascade channels 46 of the first circuit. The second inlet channel 42 is separated from the leading edge 22 by the last cascade channel of the first circuit and the adjoining imperforate partition 52. And, the third inlet channel 44 is separated from the leading edge by the two cascade channels of the first circuit and the second inlet channel 42, as well as by the intervening imperforate partitions 52.

Since the three inlet channels 40–44 are grouped together inside the airfoil, with the separate cascade circuits being distributed outwardly therefrom, the various impingement holes 50 are suitably inclined through the respective perforate partitions 48 to obliquely impinge the cooling air 32 against the corresponding portions of the airfoil inner surface. The inclination angle of the impingement holes varies as a function of the angular orientation of the perforate partitions in the respective cooling circuits relative to the corresponding concave and convex portions of the airfoil outer surface.

The first row of impingement holes 50 are preferably inclined through their respective partitions to provide the incoming cooling air firstly in impingement against the inner surface of the airfoil for maximizing impingement cooling effectiveness.

The spent impingement air in the first cascade channel of each of the three circuits is then discharged through the next row of impingement holes into the second or successive cascade channel. The impingement holes for the second channel are suitably inclined in the partitions for maximizing impingement cooling of the air against the next portion of the airfoil inner surface. In cascade fashion then, the impingement holes transfer the cooling air from channel to channel and are suitably inclined in the partitions for repeating impingement cooling of the successive portions of the inner surface of the airfoil.

In this way, the same cooling air is used in series or successively to provide cascade impingement cooling of the corresponding portions of the inner surface of the airfoil along the extent of the three cooling circuits. Both the perforate and imperforate partitions 48,52 are integral portions of the commonly cast airfoil and enjoy substantial strength for withstanding the significant centrifugal loads generated during operation. And, cascade impingement cooling is effected from the multiple partitions for increasing the surface area coverage for which impingement cooling may be introduced in the common airfoil without the need for an independent impingement baffle as typically found in stationary turbine nozzle vanes.

Accordingly, the cascade channels 46 are arranged in series from the corresponding inlet channels 40–44 along either the pressure sidewall 18 or the suction sidewall 20, or both in the preferred embodiment, for effecting cascade impingement cooling of the airfoil between the leading and trailing edges 22,24 and from root to tip of the airfoil. The cascade impingement cooling provides enhanced cooling of the inner surface of the airfoil, independently of any external cooling provided therefor.

For example, the suction sidewall 20 illustrated in FIGS. 2 and 3 may include one row of film cooling holes 54 disposed in flow communication with the last channel of the first circuit 34. Another row of the film cooling holes 54 may also be disposed through the pressure sidewall 18 in flow communication with the last channel of the first circuit 34. In this way, the two rows of film cooling holes 54 provide outlets to the first cooling circuit for discharging the spent impingement air in films along the pressure and suction sides of the airfoil for providing conventional film cooling thereof.

Similarly, the pressure sidewall 18 illustrated in FIG. 2 may include another row of the film cooling holes 54 disposed in flow communication with the last channel of the second cooling circuit 36 for providing an outlet therefor and generating additional film cooling air over the pressure sidewall downstream therefrom.

The third cooling circuit 38 illustrated in FIG. 2 may terminate in a row of trailing edge outlet holes 56 disposed along the trailing edge 24 in any conventional configuration for discharging the spent impingement air from the third circuit.

The pressure and suction sidewalls 18,20 illustrated in FIG. 2 are preferably imperforate along the three inlet channels 40–44 so that all of the incoming cooling air may be separately discharged through the cascade channels of the three circuits themselves.

In the preferred embodiment illustrated in FIG. 2, the pressure and suction sidewalls 18,20 are imperforate along the three cascade cooling circuits 34–38 except at the corresponding last channels thereof which have the corresponding rows of outlet holes 54,56 disclosed above. In alternate embodiments, additional rows of film cooling holes may be provided in the pressure or suction sidewalls, or both, in flow communication with various ones of the cascade channels to match the local variations in heat load on the airfoil. The various cooling circuits may also include conventional short ribs or turbulators along the inner surfaces of the sidewalls for enhancing heat transfer where possible.

In the preferred embodiments illustrated in FIGS. 1–5, all three cooling circuits 34,36,38 are in the form of the cascade impingement cooling circuits with the multiple cascade channels 46, their perforate partitions 48, and corresponding rows of impingement holes 50. In this way, the internal surface area of the airfoil walls subject to impingement cooling may be maximized without unduly duplicating the number of partitions therein and corresponding flow channels.

Figure 6:
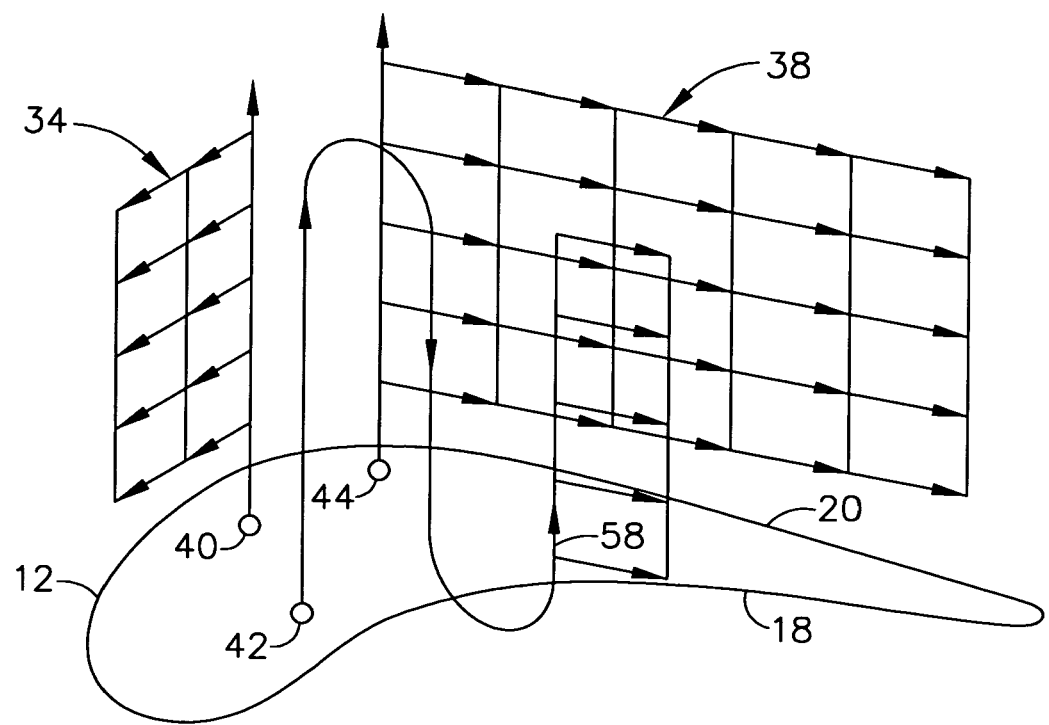
FIG. 6 is a schematic view of three cooling circuits in the airfoil illustrated in FIG. 2 in accordance with a modification thereof.
Figure 7:
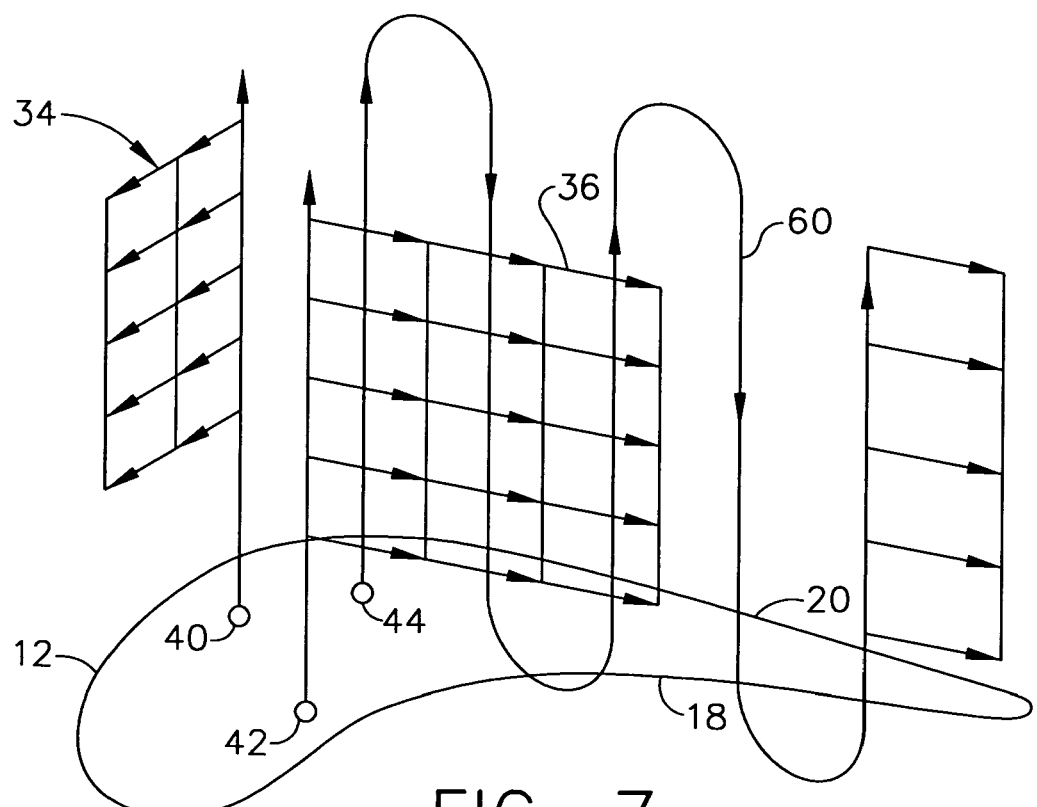
FIG. 7 is a isometric view of the airfoil illustrated in FIG. 2 in accordance with another modification thereof.

FIGS. 6 and 7 illustrate schematically modifications of the airfoil 12 illustrated in FIGS. 1–5. In both embodiments illustrated in FIGS. 6 and 7, the schematically illustrated first, second, and third cascade cooling circuits 34,36,38 are identical to their counterparts in FIGS. 1–5. However, instead of having all three cooling circuits being in the form of the cascade cooling circuits as described above, any one of those cascade circuits may instead be modified to have the multiple longitudinal channels thereof arranged end-to-end to form a continuous serpentine channel in conventional form.

More specifically, the alternate embodiment illustrated in FIG. 6 includes the first and third cascade cooling circuits 34,38 as described above, with the second cascade circuit being substituted by the serpentine cooling circuit 58 in which the longitudinal channels are disposed end-to-end from the second inlet channel 42 in the typical continuous serpentine channel fashion. In this configuration, the second cascade circuit 38 is disposed along the airfoil suction sidewall 20, and the serpentine cooling circuit 58 is disposed along the airfoil pressure sidewall 18 in parallel therewith.

Similarly, FIG. 7 illustrates an alternate embodiment in which the first cascade circuit 34 and the second cascade circuit 36 are identical to those disclosed above with respect to FIGS. 1–5. The third cascade circuit is substituted by another serpentine cooling circuit 60 in which the longitudinal channels thereof are arranged end-to-end to form a continuous serpentine channel from the third inlet channel 44. In this embodiment, the second cascade circuit 36 is disposed along the airfoil pressure sidewall 18, and the serpentine channel 60 is disposed along the airfoil suction sidewall 20 in parallel therewith.

In the FIG. 6 embodiment, the pressure-side serpentine channel 58 is a three-pass serpentine channel of any conventional configuration discharging the cooling air in impingement in a last flow channel. In the FIG. 7 embodiment, the suction-side serpentine channel 60 is a five-pass serpentine channel of any conventional configuration also discharging the cooling air in impingement in a last flow channel.

As indicated above, turbine rotor blades, and in particular first stage high pressure turbine rotor blades are subject to the highest temperature combustion gases discharged from the combustor. The differently configured pressure and suction sides of the rotor blades experience different heat loads therein from the combustion gases which flow thereover during operation. The ability to divide the airfoil into the multiple cooling circuits described above permits tailoring of the cooling effectiveness thereof as required for the corresponding heat loads in the different portions of the airfoil.

The cascade impingement cooling circuits 34–38 may be used where desired in the different portions of the airfoil for locally maximizing the surface area for successive or cascade impingement cooling. The cascade circuits may be combined with independent serpentine cooling circuits as disclosed above where desired for matching the external heat loads on the airfoil. And, other types of conventional cooling circuits may also be used to advantage with one or more of the cascade cooling circuits described above.

As indicated above, impingement cooling results in a significant pressure drop as the impingement air is discharged through a corresponding row of impingement holes in each stage of impingement. Successive stages of impingement result in additional pressure drops of the cooling air. And, the number of successive or cascade impingement stages is limited by the available pressure of the inlet cooling air relative to the local pressure of the combustion gases outside the airfoil.

In the exemplary embodiment illustrated in FIG. 2, the three cascade circuits commence near the maximum width of the airfoil behind the leading edge, with the first circuit 34 terminating near the leading edge, and the second and third circuits 36,38 terminating near or at the trailing edge 24.

The two-stage first circuit 34 experiences two impingement air pressure drops prior to discharge from the film cooling holes 54 along the pressure and suction sidewalls.

The second cascade circuit 36 experiences three pressure drops in the three stages of impingement cooling prior to discharge from the outlet holes 54. And, the third cascade circuit 38 experiences five pressure drops in the successive stages of impingement cooling prior to discharge from the outlet holes 56.

Since the second and third cascade circuits 36,38 commonly discharge the spent impingement air near the airfoil trailing edge 24, they enjoy the advantage of the decrease in external pressure of the combustion gases in this region for maximizing the pressure drop between the inlet air and the outlet air.

The various cascade impingement cooling circuits disclosed above may be used to particular advantage in high performance gas turbine engines in which the compressors thereof generate high pressure cooling air sufficient for accommodating the multiple pressure drops in cascade impingement cooling through the turbine rotor blades. The number of cascade impingement cooling stages may be varied in alternate designs to accommodate the available pressure drop in other types of gas turbine engines.

The various cascade cooling circuits described above may be conventionally cast in the turbine blade using three ceramic cores specifically configured therefor and joined together for the casting process. The various outlet holes in the airfoil may be formed after casting of the blade itself by any conventional drilling process.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A turbine blade comprising:
   an airfoil integrally joined to a mounting dovetail;
   said airfoil including opposite pressure and suction sidewalls joined together at chordally opposite leading and trailing edges and extending longitudinally from root to tip;
   a plurality of independent cooling circuits disposed inside said airfoil correspondingly along said pressure and suction sidewalls, and each including an inlet channel extending through said dovetail, and a row of outlet holes extending through said sidewalls in flow communication with a corresponding outlet channel thereof; and
   one of said cooling circuits including successive cascade channels separated by corresponding perforate partitions, each including a row of impingement holes for cascade impingement cooling the inner surface of said airfoil.

2. A blade according to claim 1 wherein:
   said cooling circuits are separated from each other along said sidewalls by imperforate partitions; and
   said inlet channels are separated from said leading edge by a flow channel disposed therebetween.

3. A blade according to claim 2 wherein:
    each of said inlet channels includes a corresponding row of said impingement holes inclined through said perforate partition thereof to obliquely impinge cooling air against said airfoil inner surface; and
    said cascade channels are arranged in series from said corresponding inlet channels along either said pressure sidewall or said suction sidewall for effecting cascade impingement cooling thereof between said leading and trailing edges.

4. A blade according to claim 3 wherein:
    a first one of said cooling circuits extends along said suction sidewall and terminates at said leading edge;
    a second one of said cooling circuits extends along said pressure sidewall and terminates before said trailing edge; and
    a third one of said cooling circuits extends along said suction sidewall behind said first cooling circuit, and in parallel with said second cooling circuit, and terminates at said trailing edge.

5. A blade according to claim 4 wherein said first cooling circuit comprises said cascade impingement cooling circuit.

6. A blade according to claim 4 wherein said second cooling circuit comprises said cascade impingement cooling circuit.

7. A blade according to claim 6 wherein said third cooling circuit comprises a serpentine cooling circuit.

8. A blade according to claim 4 wherein said third cooling circuit comprises said cascade impingement cooling circuit.

9. A blade according to claim 8 wherein said second cooling circuit comprises a serpentine cooling circuit.

10. A blade according to claim 4 wherein said first, second, and third cooling circuits each comprises said cascade impingement cooling circuit; and said three inlet channels thereof adjoin each other.

11. A turbine blade comprising:
    an airfoil integrally joined to a mounting dovetail;
    said airfoil including opposite pressure and suction sidewalls joined together at chordally opposite leading and trailing edges and extending longitudinally from root to tip;
    a plurality of independent cooling circuits disposed inside said airfoil correspondingly along said pressure and suction sidewalls, and each including an inlet channel extending through said dovetail; and
    one of said cooling circuits including successive cascade channels separated by corresponding perforate partitions, each including a row of impingement holes for cascade impingement cooling the inner surface of said airfoil.

12. A blade according to claim 11 wherein said cooling circuits are separated from each other along said sidewalls by imperforate partitions.

13. A blade according to claim 12 wherein said inlet channels are separated from said leading edge by a flow channel disposed therebetween.

14. A blade according to claim 13 wherein each of said inlet channels includes a corresponding row of said impingement holes inclined through said perforate partition thereof to obliquely impinge cooling air against said airfoil inner surface.

15. A blade according to claim 14 wherein said cascade channels are arranged in series from said corresponding inlet channels along either said pressure sidewall or said suction sidewall for effecting cascade impingement cooling thereof between said leading and trailing edges.

16. A blade according to claim 15 wherein said one cooling circuit extends along said suction sidewall and terminates at said leading edge.

17. A blade according to claim 15 wherein a second one of said cooling circuits includes multiple cascade channels separated by corresponding perforate partitions, each including a row of impingement holes for cascade impingement cooling said airfoil inner surface chordally therealong.

18. A blade according to claim 17 wherein said one cooling circuit is disposed along said suction sidewall, and said second cooling circuit is disposed along said pressure sidewall.

19. A blade according to claim 15 wherein:
    a second one of said cooling circuits includes multiple cascade channels separated by corresponding perforate partitions each including a row of impingement holes for cascade impingement cooling said airfoil inner surface chordally therealong; and
    a third one of said cooling circuits includes multiple cascade channels separated by corresponding perforate partitions each including a row of impingement holes for cascade impingement cooling said airfoil inner surface chordally therealong.

20. A blade according to claim 19 wherein:
    said one cooling circuit extends along said suction sidewall and terminates at said leading edge;
    said second cooling circuit is disposed along said pressure sidewall and terminates before said trailing edge; and
    said third cooling circuit is disposed along said suction sidewall behind said one cooling circuit, and terminates at said trailing edge.

21. A blade according to claim 20 wherein said suction sidewall includes a row of film cooling holes disposed in flow communication with the last channel of said one cooling circuit.

22. A blade according to claim 20 wherein said pressure sidewall includes a row of film cooling holes disposed in flow communication with the last channel of said second cooling circuit.

23. A blade according to claim 20 wherein said third cooling circuit terminates in a row of outlet holes disposed along said airfoil trailing edge.

24. A blade according to claim 15 wherein said pressure and suction sidewalls are imperforate along said inlet channels.

25. A blade according to claim 15 wherein said pressure and suction sidewalls are imperforate along said cooling circuits except at the corresponding last channel thereof having a row of outlet holes.

26. A blade according to claim 15 wherein another one of said cooling circuits includes multiple longitudinal channels arranged end-to-end to form a continuous serpentine channel.

27. A blade according to claim 26 wherein said cascade cooling circuit is disposed along said airfoil suction sidewall, and said serpentine cooling circuit is disposed along said pressure sidewall in parallel therewith.

28. A blade according to claim 26 wherein said cascade cooling circuit is disposed along said airfoil pressure sidewall, and said serpentine cooling circuit is disposed along said suction sidewall in parallel therewith.

* * * * *